United States Patent
Masubuchi et al.

(10) Patent No.: US 9,653,974 B2
(45) Date of Patent: May 16, 2017

(54) CORE OF ROTATING ELECTRICAL MACHINE HAVING FIXING AGENT FOR FIXING PERMANENT MAGNETS IN ACCOMMODATING SLOTS AND METHOD FOR MANUFACTURING THE CORE

(71) Applicant: TOYOTA BOSHOKU KABUSHIKI KAISHA, Aichi-ken (JP)

(72) Inventors: Yoshiaki Masubuchi, Okazaki (JP);
Masaki Sugiyama, Okazaki (JP);
Masaaki Takemoto, Toyokawa (JP);
Masayuki Kito, Okazaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 97 days.

(21) Appl. No.: 14/294,444

(22) Filed: Jun. 3, 2014

(65) Prior Publication Data

US 2014/0375165 A1    Dec. 25, 2014

(30) Foreign Application Priority Data

Jun. 21, 2013  (JP) ................. 2013-130683

(51) Int. Cl.
*H02K 15/03* (2006.01)
*H02K 1/27* (2006.01)

(52) U.S. Cl.
CPC ........... *H02K 15/03* (2013.01); *H02K 1/2766* (2013.01); *Y10T 29/49012* (2015.01)

(58) Field of Classification Search
CPC .... H02K 15/03; H02K 1/2766; H02K 1/2773; H02K 9/19; Y10T 29/49012

USPC ...................................................... 310/58–59
See application file for complete search history.

(56) References Cited

U.S. PATENT DOCUMENTS

| | | | | |
|---|---|---|---|---|
| 6,075,304 | A * | 6/2000 | Nakatsuka | H02K 3/345 29/596 |
| 6,294,618 | B1 | 9/2001 | Soelch | |
| 8,058,767 | B2 * | 11/2011 | Haruno | H02K 1/276 310/156.01 |
| 2002/0013424 | A1 | 1/2002 | Soelch | |
| 2006/0045952 | A1 * | 3/2006 | Vilchez | A23G 3/0226 426/524 |
| 2009/0278417 | A1 | 11/2009 | Mizuno et al. | |

(Continued)

FOREIGN PATENT DOCUMENTS

| | | |
|---|---|---|
| CN | 101490928 | 7/2009 |
| JP | 7-304866 | 11/1995 |

(Continued)

OTHER PUBLICATIONS

Official Action for JP Appl. No. 2013-130683 dated Mar. 1, 2016.

(Continued)

*Primary Examiner* — Hanh Nguyen
*Assistant Examiner* — Leda Pham
(74) *Attorney, Agent, or Firm* — Greenblum & Bernstein, P.L.C.

(57) ABSTRACT

A core has accommodating slots each accommodating a permanent magnet. A fixing agent is injected into the space between the inner surface of each accommodating slot and the outer surface of the associated permanent magnet. A liquid-crystal polymer is used as the fixing agent. More specifically, liquid-crystal polyester is used.

7 Claims, 4 Drawing Sheets

(56) References Cited

U.S. PATENT DOCUMENTS

| | | | | |
|---|---|---|---|---|
| 2011/0000079 A1* | 1/2011 | Fukumaru | ............ | H02K 1/2766 |
| | | | | 29/598 |
| 2011/0318982 A1* | 12/2011 | Funatsu | ............. | C09K 19/3809 |
| | | | | 442/49 |
| 2012/0139378 A1* | 6/2012 | Endo | .................... | H02K 1/2766 |
| | | | | 310/156.21 |
| 2012/0200179 A1* | 8/2012 | Matsumoto | .............. | H02K 9/19 |
| | | | | 310/43 |
| 2013/0121682 A1 | 5/2013 | Kim et al. | | |
| 2013/0122272 A1 | 5/2013 | Kim | | |
| 2013/0122273 A1 | 5/2013 | Kim | | |
| 2013/0122274 A1 | 5/2013 | Kim et al. | | |
| 2013/0123420 A1 | 5/2013 | Kim | | |
| 2015/0112019 A1 | 4/2015 | Kim et al. | | |

FOREIGN PATENT DOCUMENTS

| | | |
|---|---|---|
| JP | 2002-511513 | 4/2002 |
| JP | 2007-318942 | 12/2007 |
| JP | 2010-141989 | 6/2010 |
| JP | 2011-91913 | 5/2011 |
| JP | 2014-533325 | 12/2014 |
| WO | 2013/074476 | 5/2013 |

OTHER PUBLICATIONS

Furuhashi, "Plastics Material Introduction: Help with Product Development", Nikkan Kogyo Shimbun Ltd., May 24, 2013, along with English-language statement of relevance.

Official Action, with English-language translation thereof, for CN Appl. No. 201410267575.X dated Apr. 1, 2016.

Official Action, along with English-language translation thereof, for JP Appl. No. 2013-130683 dated Jul. 26, 2016.

* cited by examiner

CORE OF ROTATING ELECTRICAL MACHINE HAVING FIXING AGENT FOR FIXING PERMANENT MAGNETS IN ACCOMMODATING SLOTS AND METHOD FOR MANUFACTURING THE CORE

BACKGROUND OF THE INVENTION

The present invention relates to a core such as a rotor core in a rotating electrical machine such as a motor and to a method for manufacturing the core.

For example, FIG. 5 shows one example of the configuration of a known conventional rotor core 31 of a motor. According to this conventional configuration, the rotor core 31 has multiple accommodating slots 32 arranged along the outer circumference. A permanent magnet 33 is accommodated in each accommodating slot 32. The space between the inner surface of each accommodating slot 32 and the associated permanent magnet 33 is filled with fixing agent 34 for fixing the permanent magnet 33 in the accommodated state. As the fixing agent 34, epoxy resin, which is a thermosetting resin, is generally used.

The rotor core 31 is typically manufactured according to the processes described below as shown in FIG. 6. In a first step 35, core sheets are formed by pressing and laminated to form a rotor core 31. In the next step 36, a permanent magnet 33 is inserted into and accommodated in each accommodating slot 32. In the subsequent step 37, the rotor core 31, which accommodates the permanent magnets 33, is heated to about 150° C. using, for example, a heating furnace. This is because, since epoxy resin, which is a thermosetting resin, is used as the fixing agent 34 for fixing the permanent magnets 33 in the accommodated state, the rotor core 31 and the permanent magnets 33 need to be preheated prior to injection of the fixing agent 34.

In the next step 38, with the rotor core 31 and the permanent magnets 33 heated, the space between the inner surface of each accommodating slot 32 and the corresponding permanent magnet 33 is filled with the fixing agent 34, which is made of epoxy resin, using, for example, a molding machine. As the fixing agent 34 hardens, the permanent magnets 33 are fixed in the accommodating slots 32 in the accommodated state. In the subsequent step 39, the rotor core 31, in which the permanent magnets 33 are accommodated and fixed, is cooled to ordinary temperature using, for example, a cooling furnace.

After being processed through the above described steps, the rotor core 31 is subjected to further steps including installing of a rotor shaft.

Further, Japanese Laid-Open Patent Publication No. 2010-141989 discloses a conventional rotor core used in this type of motor. In this conventional configuration, the permanent magnet accommodated in each accommodating slot of the rotor core is split into two or more pieces, and a foamed plastic sheet is provided between the magnet pieces. After the permanent magnets are inserted in the accommodating slots, the foamed plastic sheets are heated so that the thickness is increased due to thermal expansion. This presses the split magnet pieces against the inner surface of the accommodating slot so that the magnet pieces are fixed in an accommodated state.

The above described conventional configurations have the following drawbacks.

In the conventional configuration shown in FIGS. 5 and 6, epoxy resin, which is thermosetting resin, is used as the fixing agent 34 for fixing the permanent magnets 33. The configuration requires the heating step 37, which is performed prior to injection of fixing agent 34 to preheat the rotor core 31 and the permanent magnet 33, and the cooling step 39, which is performed after injection of the fixing agent 34 to cool the rotor core 31 and the permanent magnet 33. Thus, a relatively large number of steps are required for manufacturing the rotor core 31, and the facility for performing the steps tend to be large scale, accordingly.

In the manufacturing process of the rotor core 31, the magnet steel, which forms the permanent magnets 33, has a property of extending in the widthwise direction as indicated by arrows in FIG. 5 when the rotor core 31 and the permanent magnets 33 are cooled to ordinary temperature. Due to this property, stress may concentrate on the permanent magnets 33 or narrow parts 311 in the outer circumference of the rotor core 31, which can deform these parts.

Further, the conventional configuration disclosed in Japanese Laid-Open Patent Publication No. 2010-141989 has foamed plastic sheets, which function as fixing agent for fixing permanent magnets in the accommodating slots. Thus, the configuration has an increased number of components of the rotor core 31. Also, during manufacturing, a foamed plastic sheet needs to be arranged between the permanent magnet pieces, and the rotor core and the permanent magnets need to be heated with the foamed plastic sheets inserted in the accommodating slots, so that the foamed plastic sheets are thermally expanded in the direction of the thickness. Thus, this conventional configuration not only has complicated manufacturing process, but also requires heating and cooling steps as in the case of the previous conventional configuration shown in FIGS. 5 and 6. That is, a relatively large number of steps are required for manufacturing a rotor core.

SUMMARY OF THE INVENTION

Accordingly, it is an objective of the present invention to provide a core of a rotating electrical machine and a method for manufacturing the core that are capable of simplifying the process for manufacturing the core and reducing stress produced during the core manufacturing process.

To achieve the foregoing objective and in accordance with one aspect of the present invention, a core of a rotating electrical machine is provided that includes a plurality of accommodating slots, a plurality of permanent magnets, each accommodated in one of the accommodating slots, and a fixing agent injected into a space between an inner surface of each accommodating slot and an outer surface of the associated permanent magnet. A liquid-crystal polymer is used as the fixing agent.

Further, a method for manufacturing the above described core of a rotating electrical machine is provided. According to the method, after the permanent magnets are accommodated in the accommodating slots of the core, the fixing agent, which is made of the liquid-crystal polymer the melt viscosity of which is less than or equal to 8.0 pascal-seconds is preferably injected into the space between the inner surface of each accommodating slot and the outer surface of the associated permanent magnet.

As described above, according to the core of the rotating electric machine and the manufacturing method, liquid-crystal polymer, which hardens at ordinary temperature, is used as a fixing agent for fixing the permanent magnets in the accommodating slots in an accommodated state. Therefore, it is not necessary to heat the core and the permanent magnets prior to injection of the fixing agent or to cool the core and the permanent magnets after injection of the fixing agent. Therefore, unlike the conventional configurations, the above described core of a rotating electrical machine and the manufacturing method eliminate the necessity for the heating and cooling steps, thereby simplifying the core manufacturing process. Further, since the permanent magnets are not heated or cooled in the core manufacturing process, the permanent magnets are not caused to extend in the widthwise direction due to temperature changes. Therefore, the above described core of a rotating electrical machine and the manufacturing method are capable of reducing stress produced in the thin parts of the core, thereby reducing possibility of deformation of the core.

The above described core of a rotating electrical machine and the manufacturing method are capable of simplifying the manufacturing process.

DETAILED DESCRIPTION OF THE PREFERRED EMBODIMENTS

A rotor core 11 of a motor according to one embodiment will now be described with reference to FIGS. 1 and 2.

Figure 1:
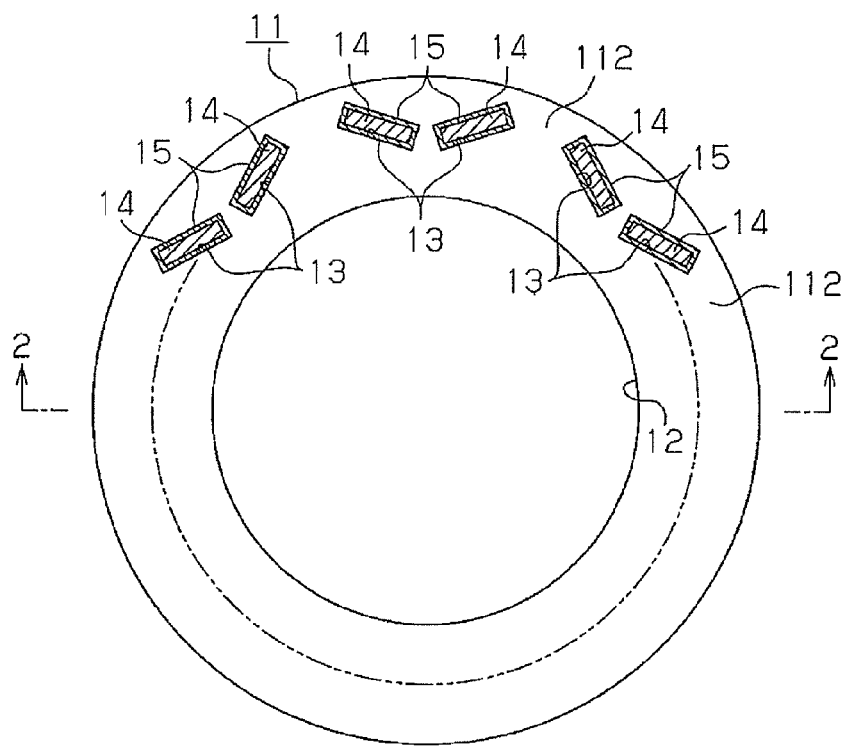
FIG. 1 is a plan view illustrating a rotor core of a motor according to one embodiment.
Figure 2:
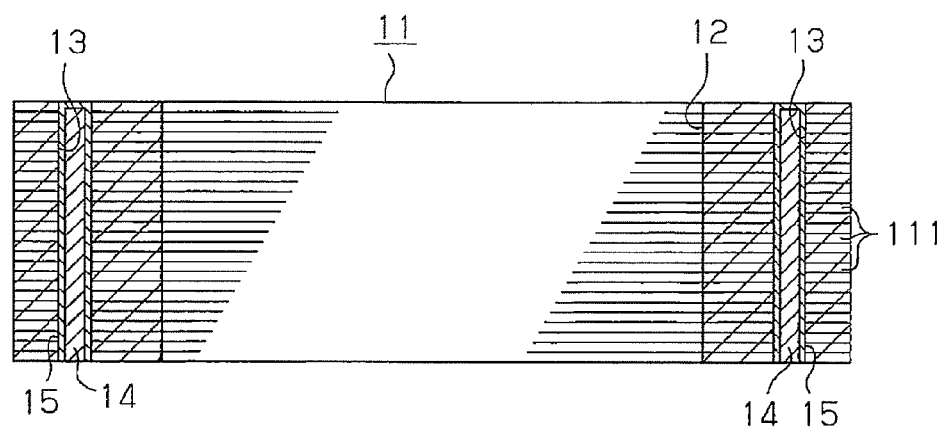
FIG. 2 is a cross-sectional view taken along line 2-2 of FIG. 1.

As shown in FIGS. 1 and 2, the rotor core 11 of the present embodiment is formed by laminating core sheets 111. The rotor core 11 has at its center a shaft hole 12, which has a circular cross-sectional shape and receives a rotor shaft (not shown). The rotor core 11 also has in its outer circumference accommodating slots 13 having a rectangular cross-sectional shape. Each accommodating slot 13 is formed close to an adjacent accommodating slot 13 to form a pair. Each accommodating slot 13 accommodates a plate-like permanent magnet 14, which extends in the direction of lamination of the core sheets 111.

As shown in FIGS. 1 and 2, the space between the inner surface of each accommodating slot 13 and the outer surface of the associated permanent magnet 14 is filled with fixing agent 15. Liquid-crystal polymer (LCP), which is a thermoplastic resin and hardens at ordinary temperature, is used as the fixing agent 15. More specifically, liquid-crystal polyester is used. The liquid-crystal polyester is a known aromatic polyester resin that is linearly ester-bonded to various known elements. For example, the liquid-crystal polyester is a wholly aromatic polyester, which belongs to thermotropic liquid-crystal. Injection and hardening of the fixing agent 15 fixes each permanent magnet 14 integrally in the corresponding accommodating slot 13 in an accommodated state.

A method for manufacturing the rotor core 11 having the above described configuration will now be described.

Figure 3:
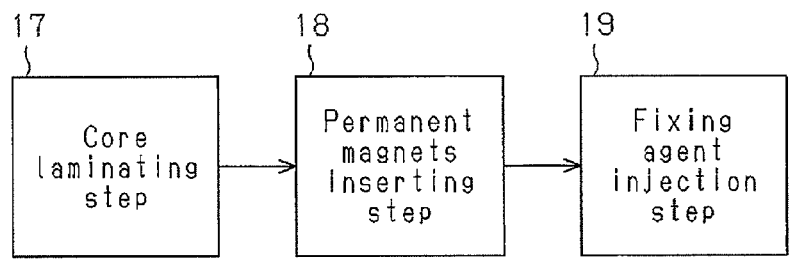
FIG. 3 is a block diagram showing, in order, steps of a method for manufacturing the rotor core of FIGS. 1 and 2.

When manufacturing the rotor core 11, three steps are performed in order as shown in FIG. 3. In a first step 17, core sheets 111 are formed by pressing magnetic material such as magnetic steel sheets, and the core sheets 111 are laminated to form a rotor core 11. In the next step 18, a permanent magnet 14 is inserted into and accommodated in each accommodating slot 13 of the rotor core 11. In the subsequent step 19, the space between the inner surface of each accommodating slot 13 and the outer surface of the permanent magnet 14 is filled with the fixing agent 15, which is made of liquid-crystal polyester, using, for example, a molding machine 20 shown in FIG. 4. The fixing agent 15 hardens at ordinary temperature, so that the permanent magnet 14 is fixed to the accommodating slot 13 in an accommodated state.

Figure 4:
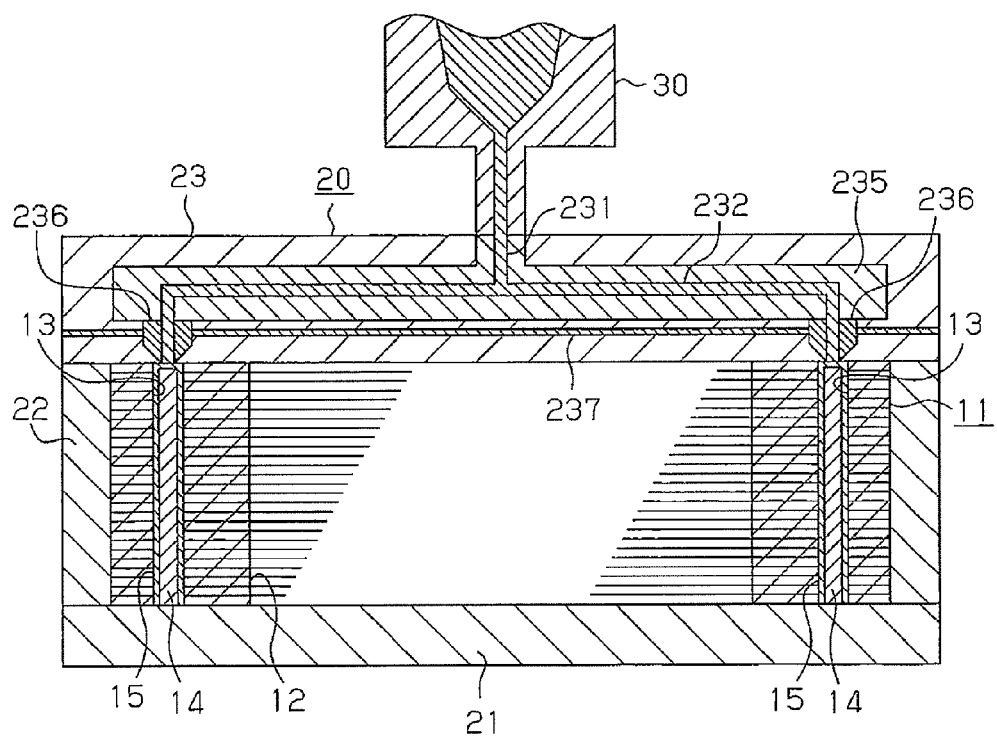
FIG. 4 is a cross-sectional view showing the injection step of a fixing agent in the manufacturing method of FIG. 3.
Figure 5:
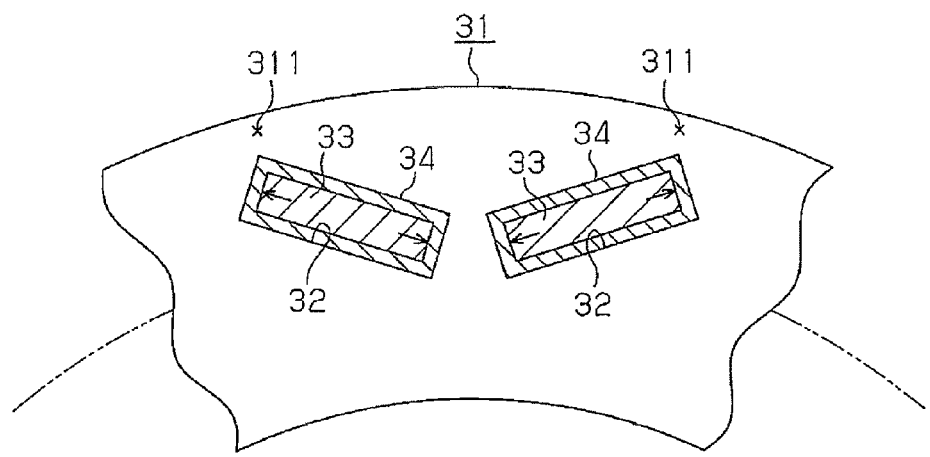
FIG. 5 is a partial plan view showing a rotor core of a conventional motor.
Figure 6:
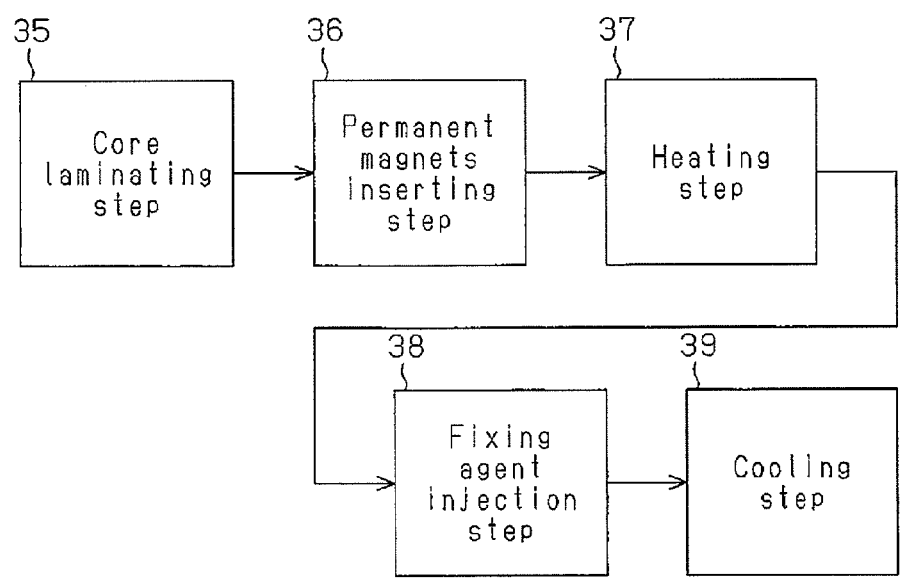
FIG. 6 is a block diagram showing, in order, steps of a method for manufacturing the rotor core of FIG. 5.

As shown in FIG. 4, the molding machine 20 includes a base 21 for supporting the rotor core 11, an annular outer frame 22 encompassing the outer circumference of the rotor core 11, and an upper frame 23 placed on the upper surface of the rotor core 11. The upper frame 23 has a heating portion 235. With the rotor core 11 set in the molding machine 20, an injection device 30 injects the fixing agent 15 into an injection passage 232 via an injection port 231 of the upper frame 23. When passing through the injection passage 232, the fixing agent 15 is maintained at 300 to 350 degrees centigrade and a low viscosity by the heating portion 235, so that favorable fluidity of the fixing agent 15 is ensured. In this state, the injection device 30 injects the fixing agent 15 in a molten state into the space between the inner surface of each accommodating slot 13 of the rotor core 11 and the outer surface of the corresponding permanent magnet 14 via nozzles 236 of the upper frame 23. In this case, the temperature of the rotor core 11 may be ordinary temperature (10 to 30 degrees centigrade), but is preferably maintained at 40 to 80 degrees centigrade. The upper frame 23 has a coolant passage 237 that prevents the rotor core 11 from overheating and maintains the temperature of the rotor core 11 at substantially ordinary temperature (10 to 30 degrees centigrade) or at 40 to 80 degrees centigrade.

At the injection of the fixing agent 15, the melt viscosity of the fixing agent 15, which is made of liquid-crystal polyester, is adjusted to 1.2 to 8.0 pascal-seconds (hereinafter, simply referred to as Pa·s) and is preferably adjusted to 1.2 to 3.5 Pa·s, at a shear speed of 1000 $\sec^{-1}$. The viscosity of the fixing agent 15 is preferably as low as possible. In other words, the viscosity is preferably as close to 0 Pa·s as possible. However, since such a liquid-crystal polymer has not been discovered to date, the lower limit of the viscosity of the fixing agent 15 is set to 1.2 Pa·s. By using the fixing agent 15 described above, the injection speed (flow velocity) of the fixing agent 15 is adjusted to 100 to 300 mm per second, and preferably to 150 to 300 mm per second. In this case, since the liquid-crystal polymer, which is used as the fixing agent 15, hardens at ordinary temperature, it is not necessary to heat the rotor core 11 and the permanent magnets 14 to high temperatures prior to injection of the fixing agent 15 or to cool the rotor core 11 and the permanent magnets 14 after injection of the fixing agent 15. Accordingly, the manufacturing process of the rotor core 11 is simplified. In some cases, the rotor core 11 is heated to a temperature slightly higher than ordinary temperature to ensure sufficient fluidity of the liquid-crystal polymer. In such a case, however, the required temperature increase is small. Thus, even if cooling is needed, the time for cooling the rotor core 11 is short, and the manufacturing process of the rotor core 11 is still simplified.

In the manufacturing process of the rotor core 11, since the permanent magnets 14 are neither heated nor cooled, the permanent magnets 14 are not substantially extended in the widthwise direction due to temperature changes. Therefore, during the manufacturing process of the rotor core 11, no great stress is produced in thin parts 112 of the rotor core 11, unlike the conventional configurations. That is, the thin parts 112 are less likely to be damaged.

The present embodiment therefore has the following advantages.

(1) A permanent magnet 14 is accommodated in each accommodating slot 13 formed in the core 11, and the space between the inner surface of the accommodating slot 13 and the outer surface of the permanent magnet 14 is filled with the fixing agent 15. Liquid-crystal polymer, which can harden at ordinary temperature, is used as the fixing agent 15. More specifically, liquid-crystal polyester is used.

Therefore, during the manufacture of the core 11, it is not necessary to heat the core 11 and the permanent magnets 14 prior to injection of the fixing agent 15 or to cool the core 11 and the permanent magnets 14 after injection of the fixing agent 15. Therefore, the above described manufacturing process of the core 11 eliminates the necessity for the heating and cooling steps, unlike the conventional configurations, thereby simplifying the manufacturing process. In the manufacturing process of the core 11, since the permanent magnets 14 are neither heated nor cooled, the permanent magnets 14 are not extended in the widthwise direction due to temperature changes. Thus, no great stress is produced in the thin parts 112 of the rotor core 11. The core 11 is therefore prevented from being deformed.

(2) In the core manufacturing method according to the present embodiment, the space between the inner surface of each accommodating slot 13 and the outer surface of the corresponding permanent magnet 14 is filled with the fixing agent 15, which is made of a liquid-crystal polymer having a melt viscosity 1.2 to 8.0 Pa·s, after the permanent magnets 14 are accommodated in the accommodating slots 13 of the core 11. Thus, the fixing agent 15 is allowed to efficiently fill the space between the inner surface of each accommodating slot 13 and the outer surface of the corresponding permanent magnet 14 at a favorably low viscosity.

(3) In the core manufacturing method according to the present embodiment, the fixing agent 15 is injected at a speed of 100 to 300 mm per second, and preferably at a speed of 150 to 300 mm per second. Therefore, the fixing agent 15 can be efficiently injected at a favorable flow velocity while maintaining a predetermined melt viscosity. The liquid-crystal polymer that is used as the fixing agent 15 has a property that the melt viscosity increases as the flow velocity is lowered.

Modifications

The above described embodiment may be modified as described below.

Figure 7:
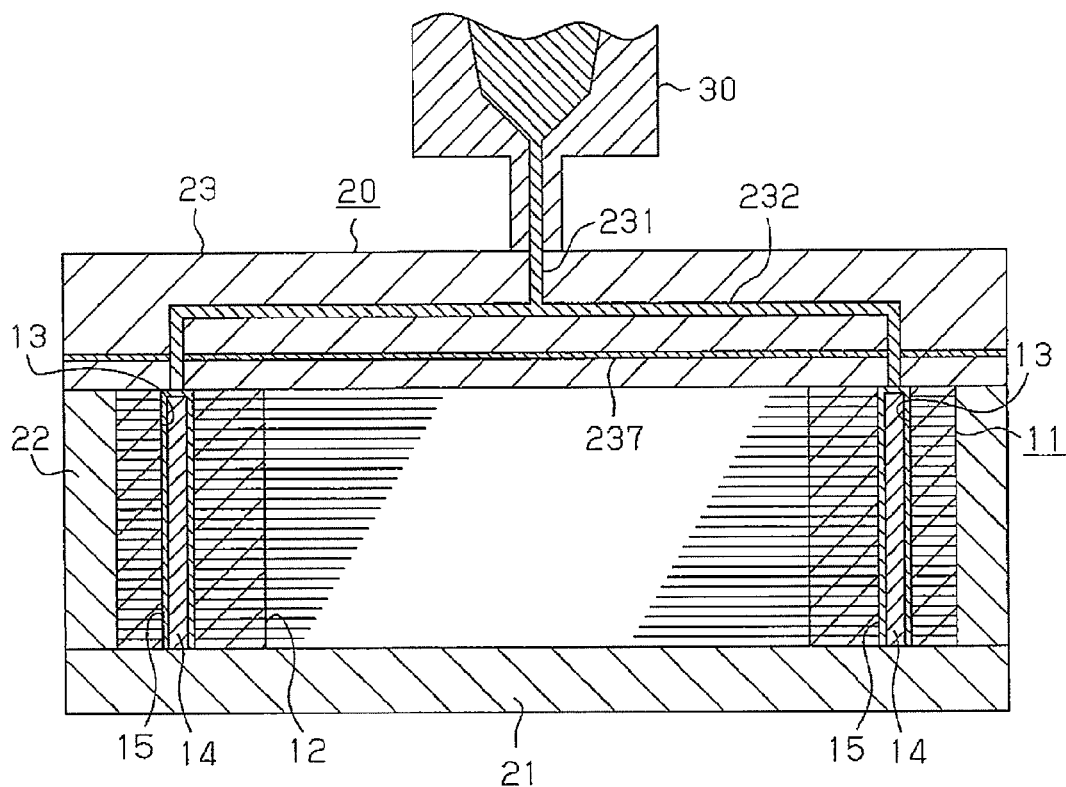
FIG. 7 is a cross-sectional view illustrating a modification of the embodiment.

As shown in FIG. 7, the heating portion 235 and the nozzles 236 in the upper frame 23 of the molding machine 20 may be omitted. If the molding machine 20 has such a structure, the temperature of the liquid-crystal polymer is slightly lower than that of the above illustrated embodiment. However, sufficient fluidity based on the low viscosity is ensured.

As the liquid-crystal polymer of the fixing agent 15, a material other than liquid-crystal polyester may be used.

The above illustrated embodiment may be applied to a method for manufacturing a stator core, in place of a method for manufacturing a rotor core.

What is claimed is:

1. A method for manufacturing a core of a rotating electrical machine, the core comprising a plurality of accommodating slots, and a plurality of permanent magnets, each permanent magnet being accommodated in one of the accommodating slots, the method comprising:
   injecting a liquid crystal polymer, which is a fixing agent, into a space between an inner surface of each accommodating slot and an outer surface of the associated permanent magnet, the injecting of the liquid crystal polymer including flowing the liquid crystal polymer through a heating portion, and
   maintaining a temperature of the core at one of a substantially ordinary temperature and a temperature between 40 and 80 degrees centigrade, as the fixing agent is being injected into the space, by flowing a coolant through a coolant passage arranged above the core, wherein
   the liquid-crystal polymer is injected into the space at a temperature between 300 and 350 degrees centigrade,
   the liquid-crystal polymer has a melt viscosity of 1.2 to 8.0 pascal-seconds at 300 to 350 degrees centigrade and at a shear speed of 1000 sec$^{-1}$, and
   the heating portion is arranged above the coolant portion.

2. The method for manufacturing the core of the rotating electrical machine according to claim 1, wherein the liquid-crystal polymer is liquid-crystal polyester.

3. The method for manufacturing the core of the rotating electrical machine according to claim 1, further comprising:
   accommodating each of the plurality of permanent magnets in one of the accommodating slots; and
   after the permanent magnets are accommodated in the accommodating slots of the core, injecting the liquid-crystal polymer into the space between the inner surface of each accommodating slot and the outer surface of the associated permanent magnet.

4. The method for manufacturing the core of the rotating electrical machine according to claim 3, wherein the melt viscosity of the injected liquid crystal polymer is 1.2 to 3.5 pascal-seconds at 300 to 350 degrees centigrade and at a shear speed of 1000 sec$^{-1}$.

5. The method for manufacturing the core of the rotating electrical machine according to claim 1, wherein the liquid crystal polymer is injected at a speed of 100 to 300 mm per second.

6. The method for manufacturing the core of the rotating electrical machine according to claim 1, wherein the liquid crystal polymer is injected at a speed of 150 to 300 mm per second.

7. The method for manufacturing the core of the rotating electrical machine according to claim 1, wherein the substantially ordinary temperature is a temperature between 10 and 30 degrees centigrade.

* * * * *